United States Patent
Hara et al.

(10) Patent No.: US 8,727,464 B2
(45) Date of Patent: May 20, 2014

(54) MULTI-FUNCTION PERIPHERAL

(75) Inventors: Koji Hara, Shiojiri (JP); Tetsuya Miyagawa, Shiojiri (JP); Naomi Kimura, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 482 days.

(21) Appl. No.: 13/243,478

(22) Filed: Sep. 23, 2011

(65) Prior Publication Data
US 2012/0086967 A1    Apr. 12, 2012

(30) Foreign Application Priority Data
Oct. 8, 2010 (JP) ................................. 2010-228182

(51) Int. Cl.
*H04N 1/04* (2006.01)
*H04N 1/34* (2006.01)

(52) U.S. Cl.
USPC ................................ 347/3; 358/494; 358/497

(58) Field of Classification Search
CPC ... H04N 1/0313; H04N 1/00525; H04N 1/12; H04N 1/1911; H04N 1/193; H04N 2201/0094; H04N 1/1017
USPC ........... 347/2, 3; 358/497, 474, 494, 471, 505
See application file for complete search history.

(56) References Cited

U.S. PATENT DOCUMENTS

| | | | |
|---|---|---|---|
| 7,253,930 B2 | 8/2007 | Hendrix et al. | |
| 7,552,922 B2 | 6/2009 | Terada | |
| 2003/0184771 A1* | 10/2003 | Yamamoto et al. | ............ 358/1.7 |
| 2009/0190190 A1 | 7/2009 | Yamauchi | |

FOREIGN PATENT DOCUMENTS

| | | |
|---|---|---|
| JP | 2004-054283 | 2/2004 |
| JP | 2006-321628 | 11/2006 |
| JP | 2009-205134 | 9/2009 |

* cited by examiner

*Primary Examiner* — Julian Huffman
(74) *Attorney, Agent, or Firm* — Workman Nydegger

(57) ABSTRACT

A multi-function peripheral includes: a recording unit having a carriage for recording which supports and moves a recording head for performing recording on a recording medium; and an image reading unit having a carriage for reading which supports and moves a reading sensor for reading an image and a driving source which is mounted in the carriage for reading in order to move the carriage for reading. The carriage for reading moves above the carriage for recording, and the driving source of the image reading unit is disposed to overlap with the carriage for recording in an up and down direction at a position deviating from a movement area of the carriage for recording.

7 Claims, 5 Drawing Sheets

MULTI-FUNCTION PERIPHERAL

BACKGROUND

1. Technical Field

The present invention relates to a multi-function peripheral in which an image reading apparatus such as a flatbed type scanner and a recording apparatus such as an ink jet type printer are combined in one body.

2. Related Art

Hitherto, there is a multi-function peripheral in which a printer unit that functions as a recording apparatus and a scanner unit that functions as an image reading apparatus are combined in one body (for example, JP-A-2006-321628). The scanner unit of the multi-function peripheral of JP-A-2006-321628 has a housing disposed on the upper side of the printer unit, a platen glass with a flat plate shape is disposed at an upper face of the housing, and an image sensor for reading an image of an original document placed on the platen glass is disposed in the housing.

On the other hand, the printer unit of the multi-function peripheral has a housing disposed on the lower side of the scanner unit, and a recording head for performing recording on a recording medium such as a sheet and a paper feed mechanism that supplies sheets of paper toward the recording head are disposed in the housing. In addition, as the recording head of the printer unit, a serial type recording head which is supported by a carriage that moves in a main scanning direction perpendicular to a paper feed direction of a sheet and forms an image on the sheet while moving in the main scanning direction along with the carriage is known.

In general, the image sensor of the scanner unit is supported by a carriage that is movable along the platen glass and reads the image of the original document while moving along with the carriage. As the carriage that supports the image sensor, there is a self-propelled type carriage in which a motor (driving source) for moving the carriage and a pinion gear rotated by the motor are mounted (for example, JP-A-2009-205134). The self-propelled carriage is moved by driving the motor in a state where the pinion gear is engaged with a rack provided on the housing side of the scanner unit.

However, in the multi-function peripheral, the carriage that supports the recording head needs a large storage space in the printer unit, and the motor mounted in the carriage needs a large storage space in the scanner unit. Therefore, in a case where the printer unit having the carriage that supports the recording head and the scanner unit having the self-propelled carriage are lined up in the up and down direction, there is a problem in that the entire height of the multi-function peripheral is increased.

SUMMARY

An advantage of some aspects of the invention is that it provides a multi-function peripheral capable of suppressing the entire height of the multi-function peripheral even in a case where a recording unit having a carriage for recording which supports a recording head and an image reading unit having a carriage for reading that has a self-propelled type are disposed to be lined up in the up and down direction.

According to an aspect of the invention, there is provided a multi-function peripheral including: a recording unit; a recording head which is provided in the recording unit for performing recording on a recording medium; a carriage for recording which is provided in the recording head to support and move the recording head; an image reading unit; a reading sensor which is provided in the image reading unit for reading an image; a carriage for reading which is provided in the image reading unit to support and move the reading sensor; and a driving source which is provided in the image reading unit and is mounted in the carriage for reading in order to move the carriage for reading, wherein the carriage for reading of the image reading unit moves above the carriage for recording of the recording unit, and the driving source of the image reading unit is disposed to overlap with the carriage for recording in an up and down direction at a position deviating from a movement area of the carriage for recording.

According to another aspect of the invention, there is provided a multi-function peripheral including: a recording unit; a recording head which is provided in the recording unit for performing recording on a recording medium; a carriage for recording which is provided in the recording head to support and move the recording head; an image reading unit; a reading sensor which is provided in the image reading unit for reading an image; a carriage for reading which is provided in the image reading unit to support and move the reading sensor; a driving source which is provided in the image reading unit and is mounted in the carriage for reading in order to move the carriage for reading; and a reading unit case which is provided in the image reading unit and stores the carriage for reading and the driving source, wherein the carriage for reading of the image reading unit moves above the carriage for recording of the recording unit, and a driving source storage case portion which stores the driving source of the reading unit case is disposed to overlap with the carriage for recording in an up and down direction at a position deviating from a movement area of the carriage for recording.

The multi-function peripheral according to the aspects of the invention is a multi-function peripheral in which a recording unit having a recording head for performing recording on a recording medium and a carriage for recording which supports and moves the recording head, and an image reading unit having a reading sensor for reading an image, a carriage for reading which supports and moves the reading sensor, and a driving source which is mounted in the carriage for reading in order to move the carriage for reading are disposed to be lined up in an up and down direction. The driving source of the image reading unit is disposed to overlap with the carriage for recording in the up and down direction at a position deviating from an upper position and a lower position of the carriage for recording.

In this configuration, since the carriage for recording and the driving source are disposed to overlap with each other in the up and down direction, the entire height of the multi-function peripheral can be reduced compared to a case where the driving source is disposed at the upper position or the lower position of the carriage for recording. Therefore, even in a case where the recording unit having the carriage for recording that supports the recording head and the image reading unit having the self-propelled type carriage for reading are disposed to be lined up in the up and down direction, the entire height of the multi-function peripheral can be suppressed.

In the multi-function peripheral according to the aspects of the invention, the recording unit further includes a recording unit case provided with an introduction opening of the recording medium on a rear surface side and provided with a discharge opening of the recording medium on a front surface side, and a feed mechanism which feeds the recording medium from the upstream side of a transport direction which becomes the rear surface side in the recording unit case to the downstream side on which recording is performed by the recording head. The carriage for recording moves along a main scanning direction intersecting the transport direction, and the driving source of the image reading unit is disposed more on the downstream side of the transport direction than the carriage for recording.

In this configuration, in the recording unit case, since the feed mechanism is not disposed more on the downstream side of the transport direction than the carriage for recording, a space in which the driving source of the image reading unit is disposed can be easily ensured compared to an area which is more on the upstream side of the transport direction than the carriage for recording.

In the multi-function peripheral according to the aspects of the invention, a first end portion in the longitudinal direction of the carriage for reading is disposed more on the downstream side in the transport direction than the driving source, and a second end portion in the longitudinal direction of the carriage for reading is disposed more on the upstream side in the transport direction than the carriage for recording. The image reading unit further includes a guide rail which supports the carriage for reading from below and guides movement of the carriage for reading in the main scanning direction that extends in the main scanning direction, and the guide rail is disposed between the driving source and the carriage for recording in the transport direction.

In this configuration, since the carriage for reading is moved along the main scanning direction like the carriage for recording, the movement path of the carriage for recording and the movement path of the carriage for reading may be disposed at positions that do not overlap with each other. In addition, as the guide rail is disposed at a position that does not overlap with the carriage for reading in the transport direction, the height of the image reading unit can be suppressed compared to a case where the guide rail is disposed immediately below the carriage for reading. Moreover, since the guide rail is disposed between the driving source and the carriage for recording in the transport direction, the guide rail can support the carriage for reading at a position closer to the center with good balance.

In the multi-function peripheral according to the aspects of the invention, the image reading unit further includes a reading unit case having a shape of a box with a bottom which stores the carriage for reading and the driving source, and a concave portion for the driving source is disposed on the recording unit and is formed at the lower portion of the reading unit case along the main scanning direction for expanding a movement space of the driving source downward.

In this configuration, since the concave portion for the driving source is formed at the lower portion of the reading unit case, by disposing the concave portion for the driving source and the carriage for recording at positions that do not overlap with each other in the transport direction, the height of the multi-function peripheral in the case where the reading unit case and the recording unit case are lined up in the up and down direction can be suppressed.

In the multi-function peripheral according to the aspects of the invention, a flexible cable extending from the rear surface side of the recording unit case is connected to the carriage for reading, and a concave portion for the cable is formed in the lower portion of the reading unit case for expanding a storage space of the flexible cable downward at a position separated from the concave portion for the driving source and the carriage for recording in the transport direction.

In this configuration, since the concave portion for the cable is formed at the position separated from the concave portion for the driving source and the carriage for recording in the transport direction in the lower portion of the reading unit case, the height of the multi-function peripheral in the case where the reading unit case and the recording unit case are lined up in the up and down direction can be suppressed.

In the multi-function peripheral according to the aspects of the invention, the reading unit case is opened and closed to open the upper surface side of the recording unit case by turning around a turning shaft that is provided on the rear surface side of the recording unit case and extends in the main scanning direction, and the concave portion for the cable is disposed more on the upstream side of the transport direction than the carriage for recording.

In this configuration, since the flexible cable is introduced to the reading unit case from the rear surface side of the recording unit case, the drawing distance of the flexible cable in the transport direction can be reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
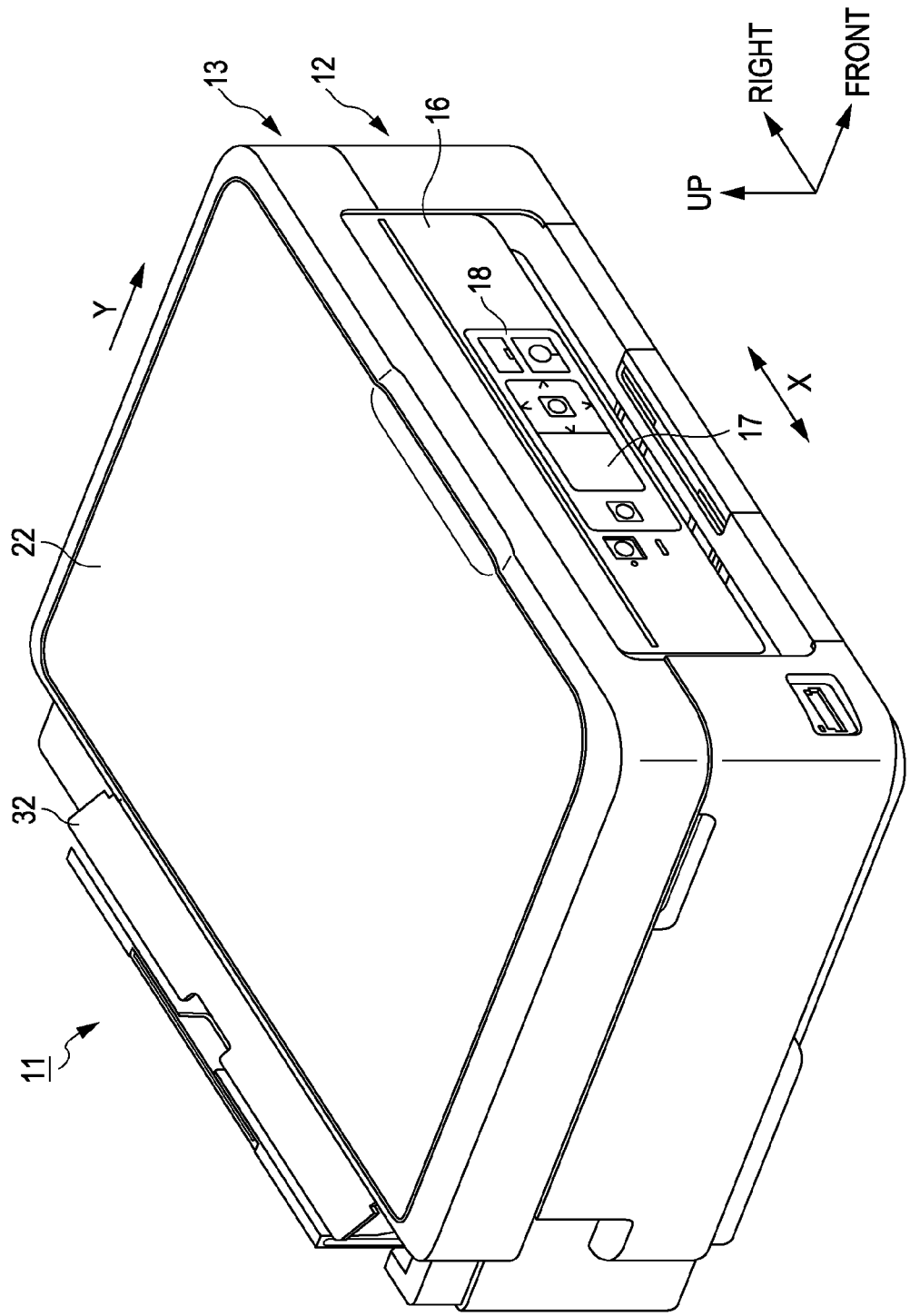
FIG. 1 is perspective view showing the outer appearance of a multi-function peripheral according to an embodiment of the invention.

Hereinafter, a multi-function peripheral according to an embodiment of the invention will be described. In the following description, a "front and rear direction", a "left and right direction", and an "up and down direction" mentioned herein respectively represent a "front and rear direction", a "left and right direction", and an "up and down direction" shown by the arrows in the drawings. In addition, from among the arrows representing the upward direction, the right direction, and the forward direction, the arrow having "•" shown in "O" (the figure showing the head of the arrow from the front) means an arrow directed from the rear of the plane of the figure to the front, and the arrow having "x" shown in "O" (the figure showing the fletching of the arrow from the rear) means an arrow directed from the front of the plane of the figure to the rear.

Figure 2:
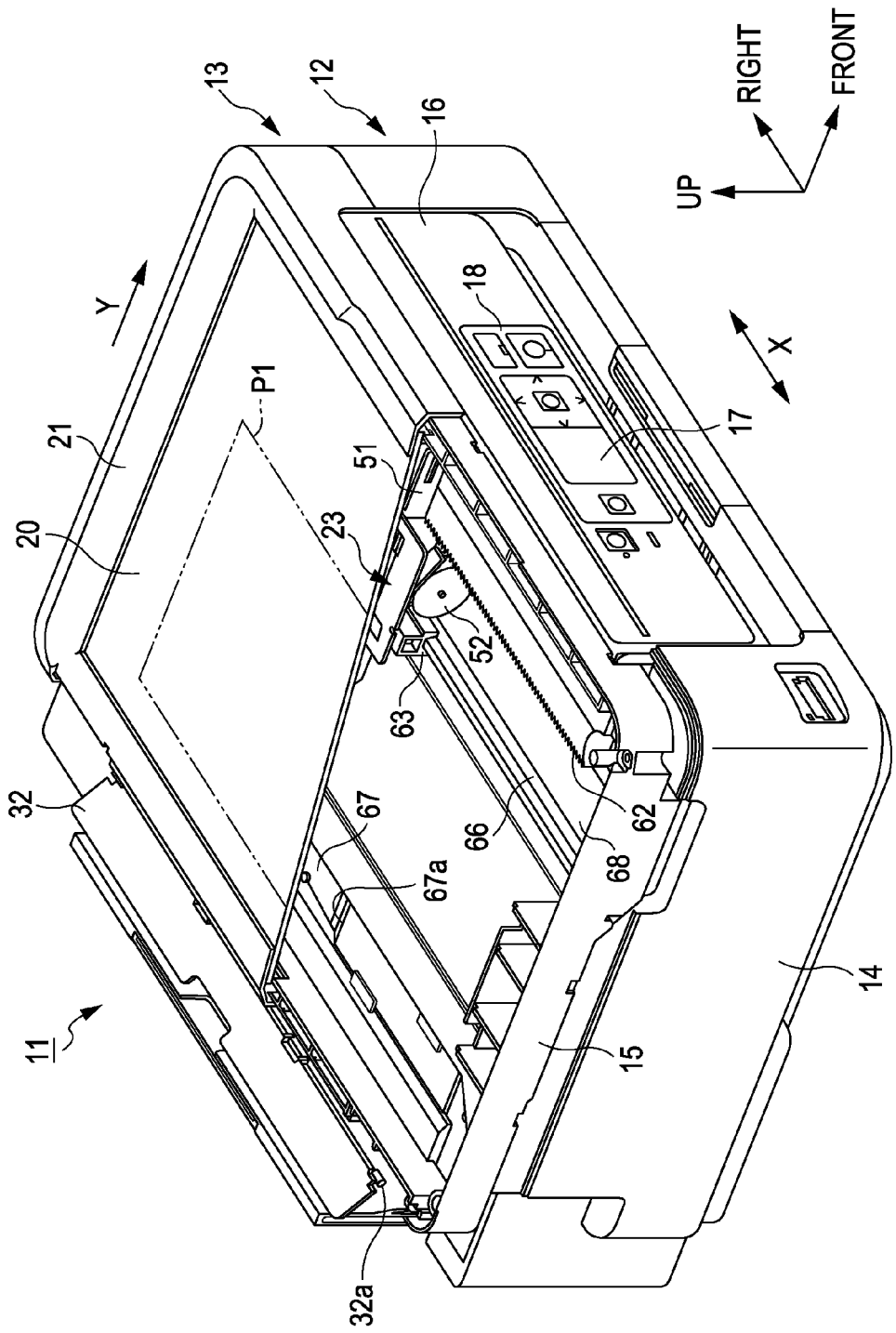
FIG. 2 is a perspective view showing the inside of an image reading unit included in the multi-function peripheral according to the embodiment.

As shown in FIG. 1, in a multi-function peripheral 11, a recording unit 12 which functions as a recording apparatus and an image reading unit 13 which functions as an image reading apparatus are disposed to be lined up in the up and down direction and are combined in one body. As shown in FIG. 2, the recording unit 12 includes a recording unit case 14 which constitutes a part of the housing. In addition, the image reading unit 13 includes a reading unit case 15 having a shape of a box with a bottom which constitutes a part of the housing. In addition, the image reading unit 13 is disposed on the upper side of the recording unit 12.

The front surface side of the multi-function peripheral 11 is provided with an operation panel 16 for operating the recording unit 12 and the image reading unit 13. The operation panel 16 is disposed in the vicinity of the center in the left and right direction and includes a display unit 17 (for example, a liquid crystal display) for displaying a menu screen or the like and an operation unit 18 provided on both the left and right sides of the display unit 17.

In the image reading unit 13, an original document table 20 made of transparent glass with a quadrangular plate shape is disposed on the upper side of the reading unit case 15. An upper side case 21 for fixing the original document table 20 is fitted to the reading unit case 15 from above.

Figure 3:
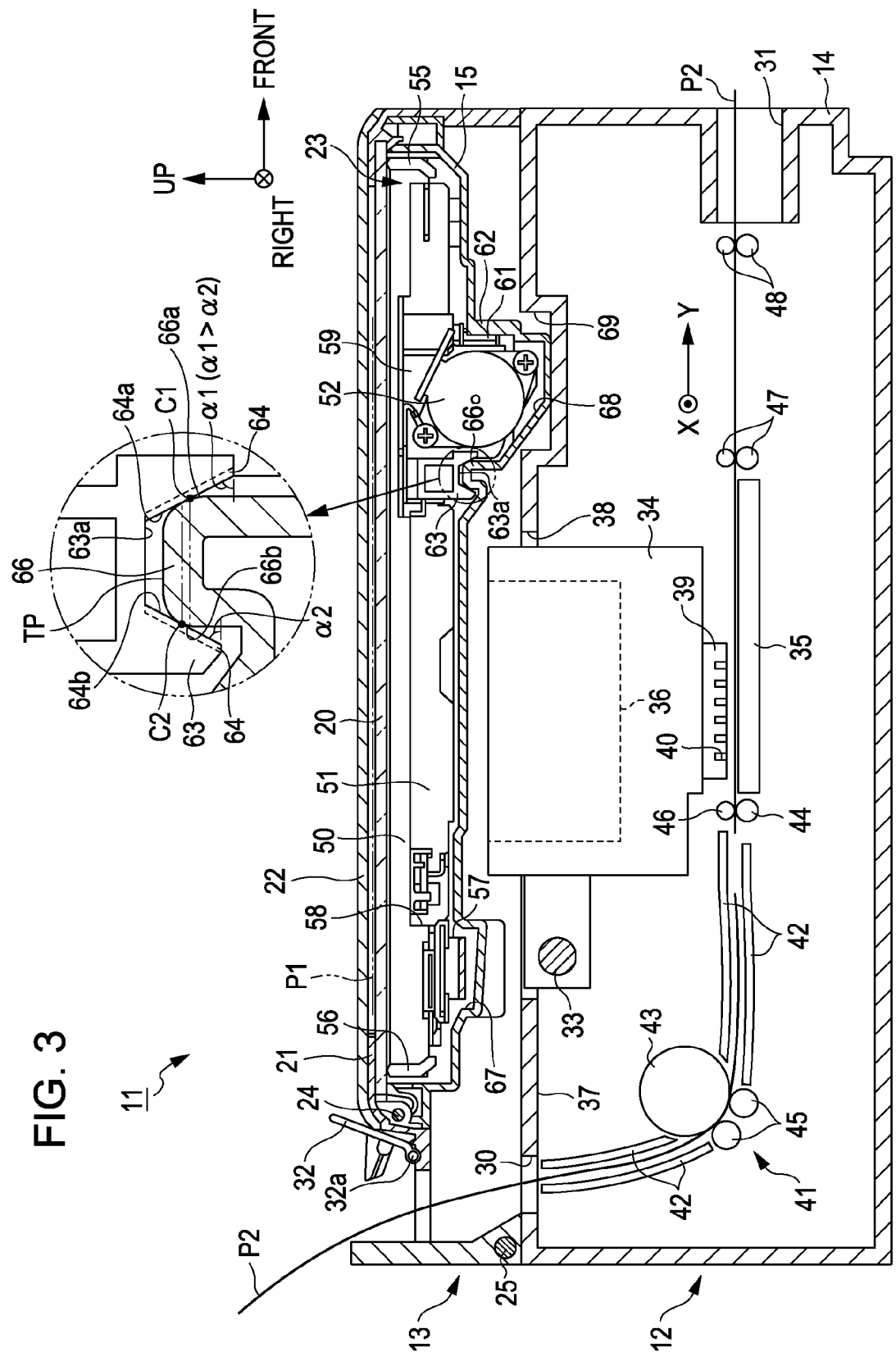
FIG. 3 is a cross-sectional view showing the configuration of the multi-function peripheral according to the embodiment.

As shown in FIG. 3, an original document cover 22 is provided on the upper side case 21 of the image reading unit 13 to be opened and closed. In addition, in FIG. 2, to clearly show the original document table 20 and the like, illustration of the original document cover 22 is omitted. On the lower side of the original document table 20 in the reading unit case 15, a scanner unit 23 is stored for reading images (characters, figures, and the like) recorded on an original document P1 placed on the upper surface of the original document table 20.

The original document cover 22 of the image reading unit 13 is opened and closed by turning around a cover shaft 24 provided on the rear surface side and extending in a main scanning direction X (the left and right direction in this embodiment), and exposes the original document table 20 as the front end side thereof is opened to be separated from the original document table 20. In addition. In a case where the image reading unit 13 reads images, the original document P1 is placed on the original document table 20 so that a reading surface of the original document P1 faces downward and then the original document cover 22 is closed, thereby causing the reading surface of the original document P1 to come in close contact with the original document table 20. The reading unit case 15 of the image reading unit 13 is opened and closed by turning around a turning shaft 25 provided on the rear surface side of the recording unit case 14 and extending in the main scanning direction X. In addition, the reading unit case 15 opens the upper surface side of the recording unit case 14 as the front end side thereof is opened to be separated from the recording unit case 14.

Next, the configuration of the recording unit 12 will be described.

On the rear surface side of the recording unit case 14, an introduction opening 30 for introducing a sheet P2 as an example of a recording medium is provided. On the front surface side of the recording unit case 14, a discharge opening 31 for discharging the sheet P2 from the recording unit case 14 is provided. In addition, above the introduction opening 30 in the image reading unit 13, an introduction opening cover 32 which is able to turn around a shaft portion 32a is provided. When manual feed printing is performed in the recording unit 12, as shown in FIG. 3, the introduction opening cover 32 is opened to insert the sheet P2 from the introduction opening 30. On the other hand, when the introduction opening 30 is not used, as shown in FIG. 1, the introduction opening cover 32 is closed such that infiltration of foreign matter and the like into the introduction opening 30 is suppressed.

As shown in FIG. 3, on the left and right side walls of the recording unit case 14, a guide shaft 33 extending along the left and right direction (the main scanning direction X) is suspended. In addition, a carriage 34 for recording is supported by the guide shaft 33 while being movable along the main scanning direction X. As the carriage 34 for recording reciprocates along the main scanning direction X as a carriage motor (not shown) is driven. Below the carriage 34 for recording in the recording unit case 14, a support member 35 is provided.

In the carriage 34 for recording, an ink cartridge 36 which stores ink as an example of a liquid is mounted to be detachable. When the ink cartridge 36 is attached to or detached from the carriage 34 for recording, the reading unit case 15 of the image reading unit 13 is opened to open the upper surface side of the recording unit case 14. A ceiling portion 37 of the recording unit case 14 is provided with an opening portion 38 to allow the carriage 34 for recording to protrude upward.

On the lower surface side of the carriage 34 for recording, a recording head 39 having an ink jet type for performing recording (printing) on the sheet P2 is supported. In the carriage 34 for recording, a supply path (not shown) is formed for supplying the ink stored in the ink cartridge 36 toward nozzles provided on the lower surface side of the recording head 39.

The recording unit 12 has a feed mechanism 41 which feeds the sheet P2 introduced from the introduction opening 30 from the upstream side of a transport direction Y (a direction intersecting the main scanning direction X) which becomes a rear surface side in the recording unit case 14 to the downstream side on which recording is performed by the recording head 39. The feed mechanism 41 includes a transport path formation member 42 for guiding the sheet P2, feed rollers 43 and 44 which rotate around a rotation shaft (not shown) extending in the left and right direction, driven rollers 45 and 46 which respectively form pairs with the feed rollers 43 and 44, and a motor (not shown) for transportation to rotate the feed rollers 43 and 44.

On the downstream side of the recording head 39 in the transport direction Y, paper discharge roller pairs 47 and 48 are provided for discharging the sheet P2 on which recording is performed by the recording head 39. In addition, the paper discharge roller pairs 47 and 48 may be rotated by the motor (not shown) for transportation or may be rotated by a motor (not shown) for paper discharge which is provided to be dedicated to paper discharge.

In the recording unit 12, recording is performed on the sheet P2 as ink is ejected from the nozzles 40 of the recording head 39 on the upper surface side of the sheet P2 that is fed by the feed mechanism 41 and supported by the support member 35. The sheet P2 on which recording is performed is discharged to the outside of the recording unit case 14 from the discharge opening 31 by the paper discharge roller pairs 47 and 48.

Next, the configuration of the scanner unit 23 will be described.

The scanner unit 23 includes a reading sensor 50 for reading images, a carriage 51 for reading which supports the reading sensor 50 to be moved in the main scanning direction X, and a motor 52 as an example of a driving source mounted in the carriage 51 for reading in order to move the carriage 51 for reading.

Figure 4:
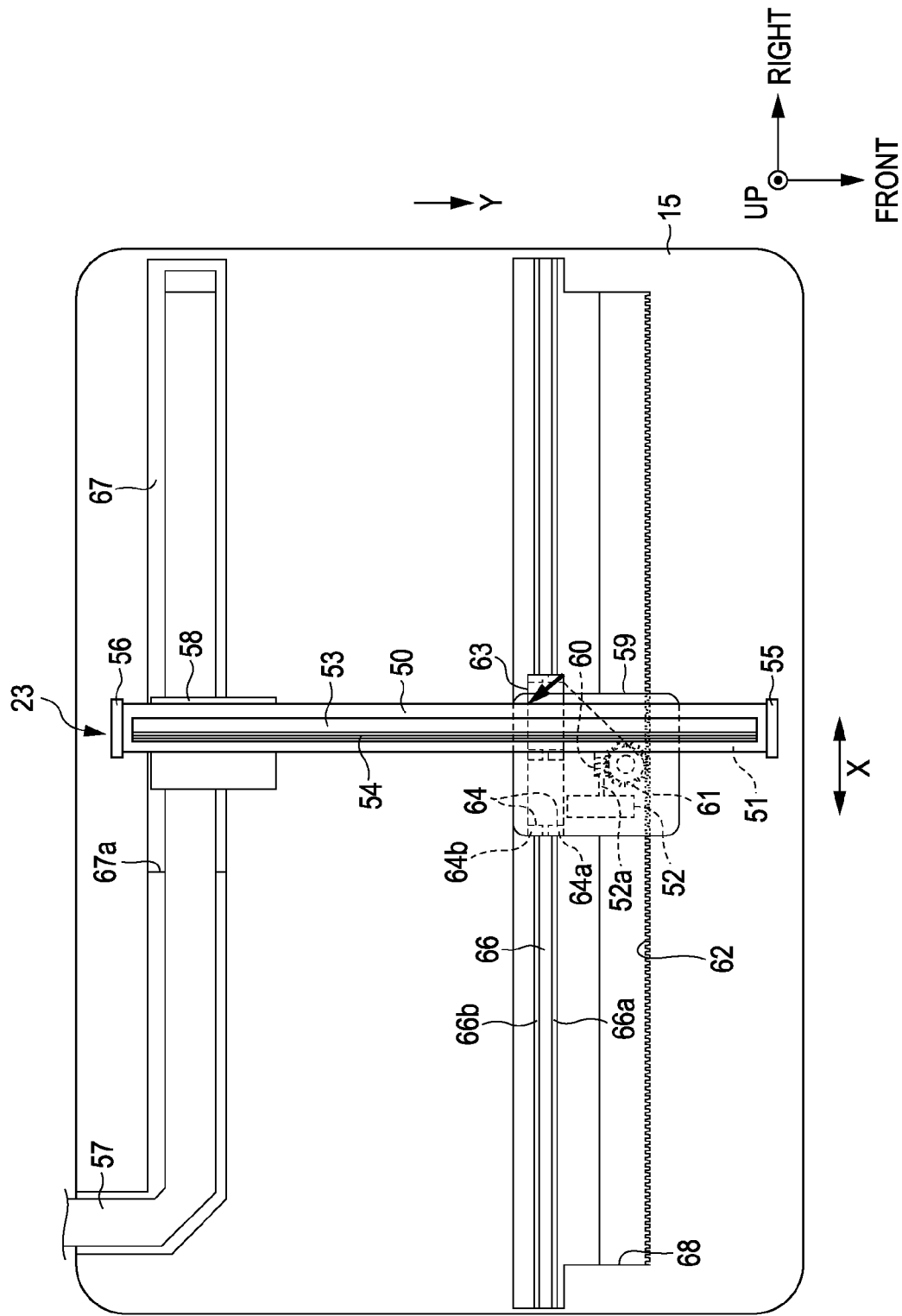
FIG. 4 is a top view showing the configuration of the image reading unit according to the embodiment.
Figure 5:
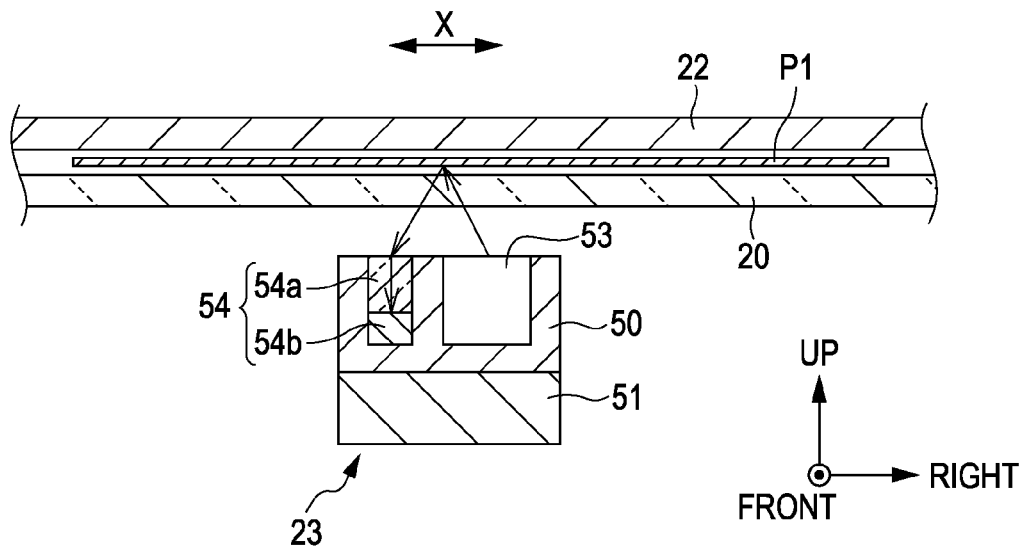
FIG. 5 is a cross-sectional view illustrating an operation of a reading sensor according to the embodiment.

As shown in FIG. 4, the reading sensor 50 has a light source unit 53 such as an LED (Light Emitting Diode) and a light reception unit 54 which receives reflected light of light emitted from the light source unit 53. As shown in FIG. 5, in the light reception unit 54, light emitted from the light source unit 53 and reflected from the original document P1 is received by a linear sensor 54b through a rod lens array 54a, such that characters, figures, and the like recorded on the original document P1 are optically read.

As shown in FIG. 4, the longitudinal directions of the reading sensor 50 and the carriage 51 for reading are the transport direction Y perpendicular to the main scanning direction X. The reading sensor 50 and the carriage 51 for reading are moved above the carriage 34 for recording of the recording unit 12. To both end sides (the front end side and the rear end side) of the carriage 51 for reading in the transport direction Y, spacers 55 and 56 are respectively mounted so that the upper ends thereof protrude to abut on the lower surface of the original document table 20. Therefore, in this embodiment, the spacer 55 constitutes a first end portion (a front end portion in this embodiment) in the longitudinal direction of the carriage 51 for reading, and the spacer 56 constitutes a second end portion (a rear end portion in this embodiment) in the longitudinal direction of the carriage 51 for reading. In addition, the spacer 55 is disposed more on the downstream side (front side) in the transport direction Y than the motor 52 while the spacer 56 is disposed more on the upstream side (rear side) in the transport direction Y than the carriage 34 for recording (see FIG. 3).

In the carriage 51 for reading, a flexible cable 57 (flexible flat cable) extending from the rear surface side of the recording unit case 14 is connected. The flexible cable 57 can bind a plurality of electric wires and the like for sending a control signal from a control device (not shown) provided in the recording unit case 14 to the motor 52 or the reading sensor 50, or sending reading data of the reading sensor 50 to the control device (not shown) in a flat plate shape. The flexible cable 57 is connected to a connection portion 58 provided at a position on the upstream side in the transport direction Y of the carriage 51 for reading.

The motor 52 is supported by a support unit 59 provided at a position on the downstream side in the transport direction Y of the carriage 51 for reading. In the support unit 59 of the carriage 51 for reading, a worm gear 60 connected to an output shaft 52a of the motor 52 and a pinion 61 which is engaged with the worm gear 60 and is rotated as the motor 52 is driven are supported. In the reading unit case 15, at a position on the downstream side in the transport direction Y, a rack portion 62 extends in the main scanning direction X as an example of a guide portion which is engaged with the pinion 61 from the front side to guide the movement of the carriage 51 for reading.

Figure 6:
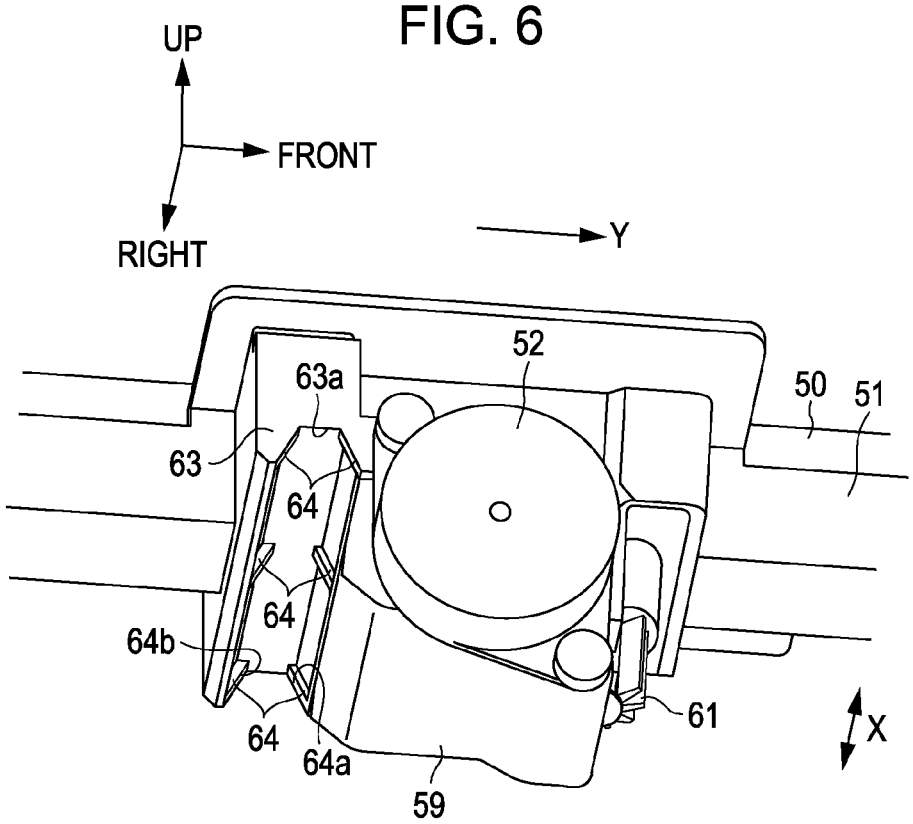
FIG. 6 is a perspective view showing ribs protruding from a slider provided in a carriage for reading according to the embodiment.

As shown in FIG. 6, at the rear of the motor 52 in the support unit 59, a slider 63 extending in the main scanning direction X is provided. The lower surface side of the slider 63 forms an engagement concave portion 63a and a plurality of (in this embodiment, 6) ribs 64 protrudes from the engagement concave portion 63a. The ribs 64 are lined up in the longitudinal direction (the transport direction Y) to form pairs, and protrude downward so that a plurality of groups (in this embodiment, 3 groups) thereof is lined up in the main scanning direction X.

As shown in FIG. 3, at a lower portion of the reading unit case 15, a guide rail 66 having a convex shape protrudes which is engaged with the engagement concave portion 63a, supports the carriage 51 for reading from below, extends in the main scanning direction X, and guides the movement of the carriage 51 for reading in the main scanning direction X. In addition, the pinion 61 is disposed at a position between the rack portion 62 and the guide rail 66 in the transport direction Y. The guide rail 66 is disposed to be lined up with the rack portion 62 in the longitudinal direction (the transport direction Y).

As shown in a partial enlarged view of FIG. 3, the guide rail 66 is provided with a top portion TP having a flat surface shape, a first support surface 66a, and a second support surface 66b. The first support surface 66a extends downward from the top portion TP toward the front side which is the rack portion 62 side in the longitudinal direction (the transport direction Y), and the second support surface 66b extends downward from the top portion TP toward the rear side which is opposite to the rack portion 62 side in the longitudinal direction. The first and second support surfaces 66a and 66b become curved surfaces having the same curvature.

In the engagement concave portion 63a of the carriage 51 for reading, a first sliding surface 64a engaged with the first support surface 66a and a second sliding surface 64b engaged with the second support surface 66b are formed to be lined up in the longitudinal direction (the transport direction Y). Specifically, the ribs 64 which form a pair in the longitudinal direction (the transport direction Y) to oppose with the guide rail 66 interposed therebetween are provided with the first sliding surface 64a and the second sliding surface 64b.

The first sliding surface 64a has a greater inclination angle which becomes a rising angle from the horizontal plane than that of the second sliding surface 64b. That is, assuming that the rising angle of the first sliding surface 64a from the horizontal plane is $\alpha 1$ and the rising angle of the second sliding surface 64b from the horizontal plane is $\alpha 2$, $\alpha 1 > \alpha 2$ is satisfied. In addition, in a state where the guide rail 66 and the engagement concave portion 63a are engaged with each other, the first sliding surface 64a abuts on the first support surface 66a at a position C1 which is lower than a position C2 at which the second sliding surface 64b abuts on the second support surface 66b.

The carriage 51 for reading is moved along the main scanning direction X while being guided by the guide rail 66 as the motor 52 is driven in the state where the pinion 61 is engaged with the rack portion 62 and thus the pinion 61 is rotated while coming into contact with the rack portion 62. Here, in the carriage 51 for reading, a moment about an engagement point of the pinion 61 and the rack portion 62 is generated. For example, in a case where the pinion 61 in FIG. 4 is rotated counterclockwise and the carriage 51 for reading is moved in the left direction, a moment to rotate the carriage 51 for reading counterclockwise is generated. Accordingly, particularly on the right end side of the slider 63, a force to cause the rib 64 to ride on the guide rail 66 is exerted as shown by the arrow of FIG. 4; however, the inclination angle $\alpha 1$ of the first sliding surface 64a is set to an angle capable of suppressing the riding. That is, the inclination angle $\alpha 1$ of the first sliding surface 64a is set to be greater than that in a case where riding of the slider 63 on the guide rail 66 is not considered.

Here, when the inclination angle of the first sliding surface 64a or the second sliding surface 64b becomes too great, engagement of the guide rail 66 and the engagement concave portion 63a is deepened, resulting in an increase in sliding load.

Therefore, the inclination angle $\alpha 2$ of the second sliding surface 64b is set to be smaller than that in the case where riding of the slider 63 on the guide rail 66 is not considered. That is, assuming that the inclination angle of the first sliding surface 64a and the second sliding surface 64b in the case where riding of the slider 63 on the guide rail 66 is not considered is $\alpha 3$, $\alpha 1 > \alpha 3 > \alpha 2$ is satisfied.

As shown in FIG. 4, in the lower portion of the reading unit case 15, at a position corresponding to the connection portion 58 in the transport direction Y, a concave portion 67 for the cable is formed to expand the storage space of the flexible cable 57 downward. In addition, the flexible cable 57 extends from the left to the right and then an end portion that is bent to the left in the vicinity of the right end of the concave portion 67 for the cable is connected to the connection portion 58 of the carriage 51 for reading. Therefore, in the concave portion 67 for the cable, according to the bending displacement of the flexible cable 57, the depth of the lower portion thereof is deepened from an extension portion 67a to the right so that the storage space expands downward as it goes to the right. In addition, since the flexible cable 57 is lined along the turning shaft 25 which connects the recording unit case 14 and the reading unit case 15 on the rear surface side, the concave portion 67 for the cable is disposed more on the upstream side in the transport direction Y than the carriage 34 for recording.

In addition, in the lower portion of the reading unit case 15, at a position corresponding to the support unit 59 in the transport direction Y, a concave portion 68 for the driving source is formed along the main scanning direction X to expand the movement space of the motor 52 downward. As shown in FIG. 3, in the image reading unit 13, particularly the motor 52 needs a large storage space in the up and down direction (the vertical direction), and in the recording unit 12, particularly the carriage 34 for recording needs a large storage space in the up and down direction (the vertical direction). Therefore, the motor 52 of the image reading unit 13 is disposed to overlap with the carriage 34 for recording in the up and down direction at a front position deviating from the upward position and the downward position of the carriage 34 for recording. That is, the motor 52 which is the driving source of the image reading unit 13 is disposed to overlap with the carriage 34 for recording in the up and down direction at a position deviating from the movement area of the carriage 34 for recording.

As such, the storage space of the motor 52 and the storage space of the carriage 34 for recording overlap with each other in the up and down direction. In addition, the lower end position of the motor 52 is positioned on the lower side than the upper end position of the carriage 34 for recording. In addition, at a position lower than the concave portion 68 for the driving source in the ceiling portion 37 of the recording unit case 14, a concave portion 69 for avoiding interference of the concave portion 68 for the driving source is formed.

In addition, since the feed mechanism 41 is disposed on the upstream side of the carriage 34 for recording in the transport direction Y, the concave portion 68 for the driving source and the concave portion 69 are disposed on the downstream side of the carriage 34 for recording on which there is a relative space margin in the recording unit case 14. That is, the motor 52 of the image reading unit 13 is disposed more on the downstream side of the transport direction Y than the carriage 34 for recording.

Moreover, if the guide rail 66 is deposed below the motor 52, the height of the image reading unit 13 is increased. Therefore, the guide rail 66 is disposed between the motor 52 and the carriage 34 for recording in the transport direction Y. In addition, the concave portion 67 for the cable is disposed at a position separated from the concave portion 68 for the driving source and the carriage 34 for recording in the transport direction Y. Specifically, to reduce the drawing length of the flexible cable 57, the concave portion 67 for the cable is disposed more on the upstream side of the transport direction Y than the carriage 34 for recording (see FIG. 3). That is, in order to suppress an increase in the height of the multi-function peripheral 11 in the case where the recording unit 12 and the image reading unit 13 are lined up in the up and down direction, the arrangement of the members is adjusted.

According to the embodiment, the following effects can be obtained.

(1) Since the carriage 34 for recording and the motor 52 are disposed to overlap with each other in the up and down direction, the entire height of the multi-function peripheral can be reduced compared to a case where the motor 52 is disposed at the upper position or the lower position of the carriage 34 for recording. Therefore, even in a case where the recording unit 12 having the carriage 34 for recording that supports the recording head 39 and the image reading unit 13 having the self-propelled carriage 51 for reading are disposed to be lined up in the up and down direction, the entire height of the multi-function peripheral can be suppressed.

(2) In the recording unit case 14, since the feed mechanism 41 is not disposed more on the downstream side of the transport direction Y than the carriage 34 for recording, a space in which the motor 52 of the image reading unit 13 is disposed can be easily ensured compared to an area which is more on the upstream side of the transport direction Y than the carriage 34 for recording.

(3) Since the carriage 51 for reading is moved along the main scanning direction X like the carriage 34 for recording, the movement path of the carriage 34 for recording and the movement path of the carriage 51 for reading may be disposed at positions that do not overlap with each other. In addition, as the guide rail 66 is disposed at a position that does not overlap with the carriage 51 for reading in the transport direction Y, the height of the image reading unit 13 can be suppressed compared to a case where the guide rail 66 is disposed immediately below the carriage 51 for reading. Moreover, since the guide rail 66 is disposed between the motor 52 and the carriage 34 for recording in the transport direction Y, the guide rail 66 can support the carriage 51 for reading at a position closer to the center with good balance.

(4) Since the concave portion 68 for the driving source is formed at the lower portion of the reading unit case 15, by disposing the concave portion 68 for the driving source and the carriage 34 for recording at positions that do not overlap with each other in the transport direction Y, the height of the multi-function peripheral in the case where the reading unit case 15 and the recording unit case 14 are lined up in the up and down direction can be suppressed.

(5) Since the concave portion 67 for the cable is formed at the position separated from the concave portion 68 for the driving source and the carriage 34 for recording in the transport direction Y in the lower portion of the reading unit case 15, the height of the multi-function peripheral in the case where the reading unit case 15 and the recording unit case 14 are lined up in the up and down direction can be suppressed.

(6) Since the flexible cable 57 is introduced to the reading unit case 15 from the rear surface side of the recording unit case 14, the drawing distance of the flexible cable 57 in the transport direction Y can be reduced.

In addition, the embodiment may be modified as follows.

The rack portion 62 may be configured so that the tooth portions protrude upward and the pinion 61 may be disposed on the rack portion 62. In addition, by changing the guide rail 66 and the slider 63, 2 groups of pinions and rack portions may be disposed along the transport direction Y, and the movement of the carriage 51 for reading may be guided by the two groups of pinions and rack portions.

For example, in a case of a configuration in which maintenance such as attaching or detaching the ink cartridge 36 to or from the front surface side or the side surface side of the recording unit 12 or solving paper jams and the like can be performed, a configuration in which the reading unit case 15 is not opened or closed may be employed. In this case, the flexible cable 57 may extend from an arbitrary position of the recording unit case 14. In the case where the reading unit case 15 is not opened or closed, the reading unit case 15 and the recording unit case 14 may be formed integrally with each other. In this case, the ceiling portion 37 of the recording unit case 14, the concave portion 68 for the driving source, the concave portion 67 for the cable, the concave portion 69, and the like may not be provided.

When a space for drawing the flexible cable 57 to the rear of the carriage 51 for reading can be ensured, the concave portion 67 for the cable may not be provided in the lower portion of the reading unit case 15.

In the transport direction Y, the arrangement of the concave portion 67 for the cable, the carriage 34 for recording, the concave portion 68 for the driving source (the motor 52) may be changed. For example, the concave portion 68 for the driving source (the motor 52) may be disposed on the upstream side (the rear side) in the transport direction Y of the carriage 34 for recording.

In the recording unit 12, an off carriage type in which the ink cartridge 36 is not mounted in the carriage 34 for recording but is mounted on the recording unit case 14 side may be employed. In this case, the opening portion 38 may not be provided in the ceiling portion 37 of the recording unit case 14. However, even in the off carriage type, for maintenance such as solving paper jams of the sheet P2 or the like, the configuration in which the reading unit case 15 is opened and closed may be employed.

A sheet cassette in which a plurality of sheets P2 can be set may be mounted below the support member 35 and the sheets P2 may be automatically fed toward the recording head 39 side from the sheet cassette by the feed mechanism 41. In this case, the introduction opening 30 may not be provided in the recording unit case 14, and both the automatic feed and the manual feed through the introduction opening 30 may be allowed.

The recording medium is not limited to sheets and may be made of an arbitrary material such as metal, a plastic film, or fabric.

The recording unit 12 may employ a liquid ejecting apparatus having a liquid ejecting head or the like which ejects or discharge a small amount of liquid droplets of liquid other than ink. In addition, the liquid droplets represent liquid states discharged from the liquid ejecting apparatus, the liquid states including granular, tear-like, and thread-like shapes with trails. The liquid mentioned herein may be any material that can be ejected by the liquid ejecting apparatus. For example, the liquid may include a material in a state where the material has a liquid phase, liquid-state materials with high or low viscosities, sol, gel water, and fluid-state materials such as inorganic solvents, organic solvents, solutions, liquid resin, and liquid metal (metallic melt), in addition to liquids as a state of the material, and a material in which particles of functional materials made of solids such as pigments or metallic particles are dissolved, dispersed, or mixed with the solvent.

As a representative example of the liquid, there is the ink described above in the embodiment or a liquid crystal. Here, the ink may include various kinds of liquid compositions such as general water-based ink, oil-based ink, gel ink, and hot-melt ink.

The image reading unit 13 may be a barcode reader, an optical character reader, or the like. The reading sensor 50 is not limited to a CIS (Contact Image Sensor) type and may employ other reading types such as a CCD (Charge Coupled Device) type.

The image reading unit 13 may be disposed under the recording unit 12.

The multi-function peripheral 11 is not limited to a printer having a scanner function and may be a fax machine or a copy machine without an original document cover 22.

The entire disclosure of Japanese Patent Application No. 2010-228182, filed Oct. 8$^{th}$, 2010 is expressly incorporated by reference herein.

What is claimed is:

1. A multi-function peripheral comprising:
a recording unit;
a recording head which is provided in the recording unit for performing recording on a recording medium;
a carriage for recording which is provided in the recording unit to support and move the recording head;
an image reading unit;
a reading sensor which is provided in the image reading unit for reading an image;
a carriage for reading which is provided in the image reading unit to support and move the reading sensor; and
a driving source which is provided in the image reading unit and is mounted in the carriage for reading in order to move the carriage for reading,
wherein the carriage for reading of the image reading unit moves above the carriage for recording of the recording unit, and
the driving source of the image reading unit is disposed to overlap with the carriage for recording in an up and down direction at a position deviating from a movement area of the carriage for recording.

2. The multi-function peripheral according to claim 1,
wherein the recording unit has a feed mechanism that feeds the recording medium toward a downstream side on which recording is performed by the recording head,
the carriage for recording of the recording unit moves along a direction intersecting a transport direction, and
the driving source of the image reading unit is disposed more on the downstream side of the transport direction than the carriage for recording of the recording unit.

3. The multi-function peripheral according to claim 1,
wherein the image reading unit has a guide rail which supports the carriage for reading from below and extends in a movement direction of the carriage for recording to guide movement of the carriage for reading, and
the guide rail of the carriage for reading is disposed between the driving source and the carriage for recording in the transport direction.

4. The multi-function peripheral according to claim 1,
wherein the image reading unit has a flexible cable connected to the carriage for reading, and
the flexible cable is disposed on the opposite side to the driving source of the image reading unit with respect to the carriage for recording of the recording unit.

5. A multi-function peripheral comprising:
a recording unit;
a recording head which is provided in the recording unit for performing recording on a recording medium;
a carriage for recording which is provided in the recording unit to support and move the recording head;
an image reading unit;
a reading sensor which is provided in the image reading unit for reading an image;
a carriage for reading which is provided in the image reading unit to support and move the reading sensor;
a driving source which is provided in the image reading unit and is mounted in the carriage for reading in order to move the carriage for reading; and
a reading unit case which is provided in the image reading unit and stores the carriage for reading and the driving source,
wherein the carriage for reading of the image reading unit moves above the carriage for recording of the recording unit, and a driving source storage case portion which stores the driving source of the reading unit case is disposed to overlap with the carriage for recording in an up and down direction at a position deviating from a movement area of the carriage for recording.

6. The multi-function peripheral according to claim 5,
wherein the image reading unit has a flexible cable connected to the carriage for reading,
the reading unit case has a flexible cable storage case portion which stores the flexible cable, and
the flexible cable storage case portion protrudes toward the recording unit.

7. The multi-function peripheral according to claim 6, wherein the flexible cable storage case portion is disposed on the opposite side to the driving source of the image reading unit with respect to the carriage for recording of the recording unit.

\* \* \* \* \*